(12) United States Patent
Will et al.

(10) Patent No.: US 8,887,907 B2
(45) Date of Patent: Nov. 18, 2014

(54) SECURITY CONTAINER WITH REPLACEABLE FACEPLATE

(75) Inventors: Adam Mark Will, Fort Mill, SC (US); William R. Beatty, Davidson, NC (US); Matthew R. Shute, Huntersville, NC (US)

(73) Assignee: Checkpoint Systems, Inc., Thorofare, NJ (US)

( * ) Notice: Subject to any disclaimer, the term of this patent is extended or adjusted under 35 U.S.C. 154(b) by 69 days.

(21) Appl. No.: 13/248,720

(22) Filed: Sep. 29, 2011

(65) Prior Publication Data

US 2012/0085757 A1 Apr. 12, 2012

Related U.S. Application Data

(60) Provisional application No. 61/391,270, filed on Oct. 8, 2010.

(51) Int. Cl.
| | | |
|---|---|---|
| *B65D 85/57* | (2006.01) | |
| *G11B 33/04* | (2006.01) | |
| *A47F 7/00* | (2006.01) | |
| *E05B 73/00* | (2006.01) | |
| *G11B 33/00* | (2006.01) | |
| *B65D 25/00* | (2006.01) | |

(52) U.S. Cl.
CPC ........ *G11B 33/0438* (2013.01); *G11B 33/0455* (2013.01); *A47F 7/00* (2013.01); *E05B 73/00* (2013.01); *G11B 33/00* (2013.01); *B65D 25/00* (2013.01)
USPC .................... 206/308.2; 206/1.5; 206/387.11; 220/4.22; 70/57.1

(58) Field of Classification Search
CPC .. E05B 73/00; E05B 73/0017; E05B 73/0023
USPC ................. 220/4.22, 22, 72, 23.8; 206/45.31, 206/45.34, 1.5, 387, 815, 232, 308.2, 206/387.11; 70/57.1
See application file for complete search history.

(56) References Cited

U.S. PATENT DOCUMENTS

| | | | | |
|---|---|---|---|---|
| 4,381,836 | A | * | 5/1983 | Rivkin et al. ............. 206/387.11 |
| 4,385,693 | A | * | 5/1983 | Gelardi et al. ............. 206/387.1 |
| 4,519,500 | A | | 5/1985 | Perchak |
| 4,558,782 | A | * | 12/1985 | Iverson et al. ........... 206/387.11 |
| 4,589,549 | A | | 5/1986 | Hehn |
| 4,838,420 | A | * | 6/1989 | Collett et al. .............. 206/387.1 |
| 4,878,073 | A | | 10/1989 | Hoonsbeen |
| 5,239,437 | A | | 8/1993 | Hoge et al. |
| 5,277,308 | A | * | 1/1994 | Finke et al. ................ 206/387.1 |
| 5,395,137 | A | | 3/1995 | Kim |
| 5,445,269 | A | | 8/1995 | Williams |
| 5,454,932 | A | * | 10/1995 | Tardif et al. ................ 206/387.1 |
| 6,264,046 | B1 | | 7/2001 | Ford |
| 6,694,782 | B2 | | 2/2004 | Mitsuyama |
| 6,716,032 | B2 | | 4/2004 | Reisz et al. |

(Continued)

*Primary Examiner* — Anthony Stashick
*Assistant Examiner* — Ernesto Grano
(74) *Attorney, Agent, or Firm* — Nathaniel T. Quirk; Richard A. Howe, II

(57) ABSTRACT

The invention relates to a security container formed to receive a cassette which visually indicates to a user what type or style of good is contained therein. The cassette may be of a general solid block type in one color or having one visual characteristic, or the cassette may have multiple inserts or slides which may be moved within the cassette to change the outwardly facing color or visible characteristic.

19 Claims, 6 Drawing Sheets

(56) References Cited

U.S. PATENT DOCUMENTS

| | | | |
|---|---|---|---|
| 6,832,498 B2 * | 12/2004 | Belden et al. ............... 70/57.1 |
| 7,028,836 B2 | 4/2006 | Hsiao et al. |
| 7,689,316 B1 | 3/2010 | Frederick et al. |
| 2004/0007595 A1 | 1/2004 | Stull et al. |
| 2010/0059533 A1 | 3/2010 | Unger et al. |

* cited by examiner

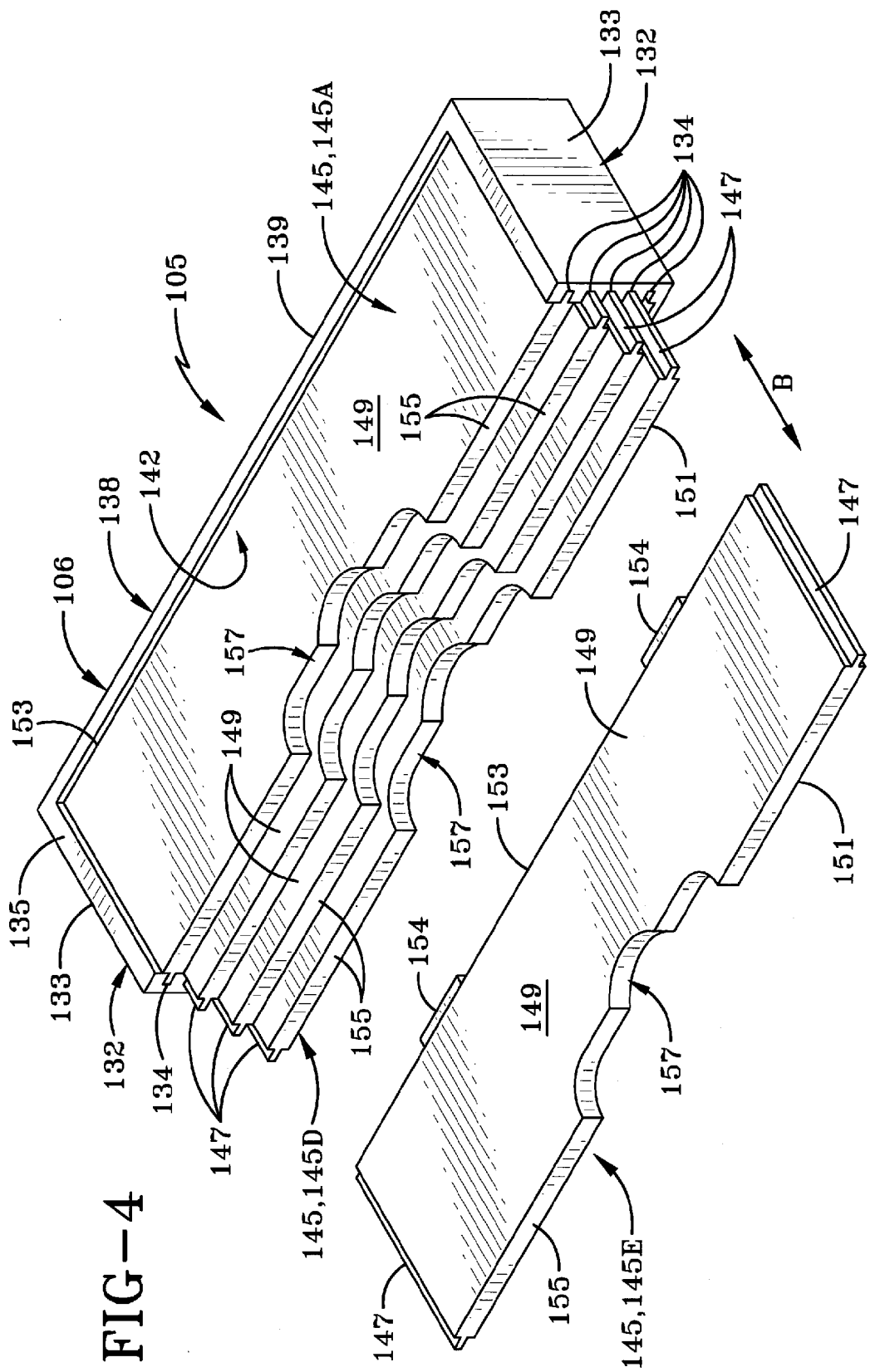

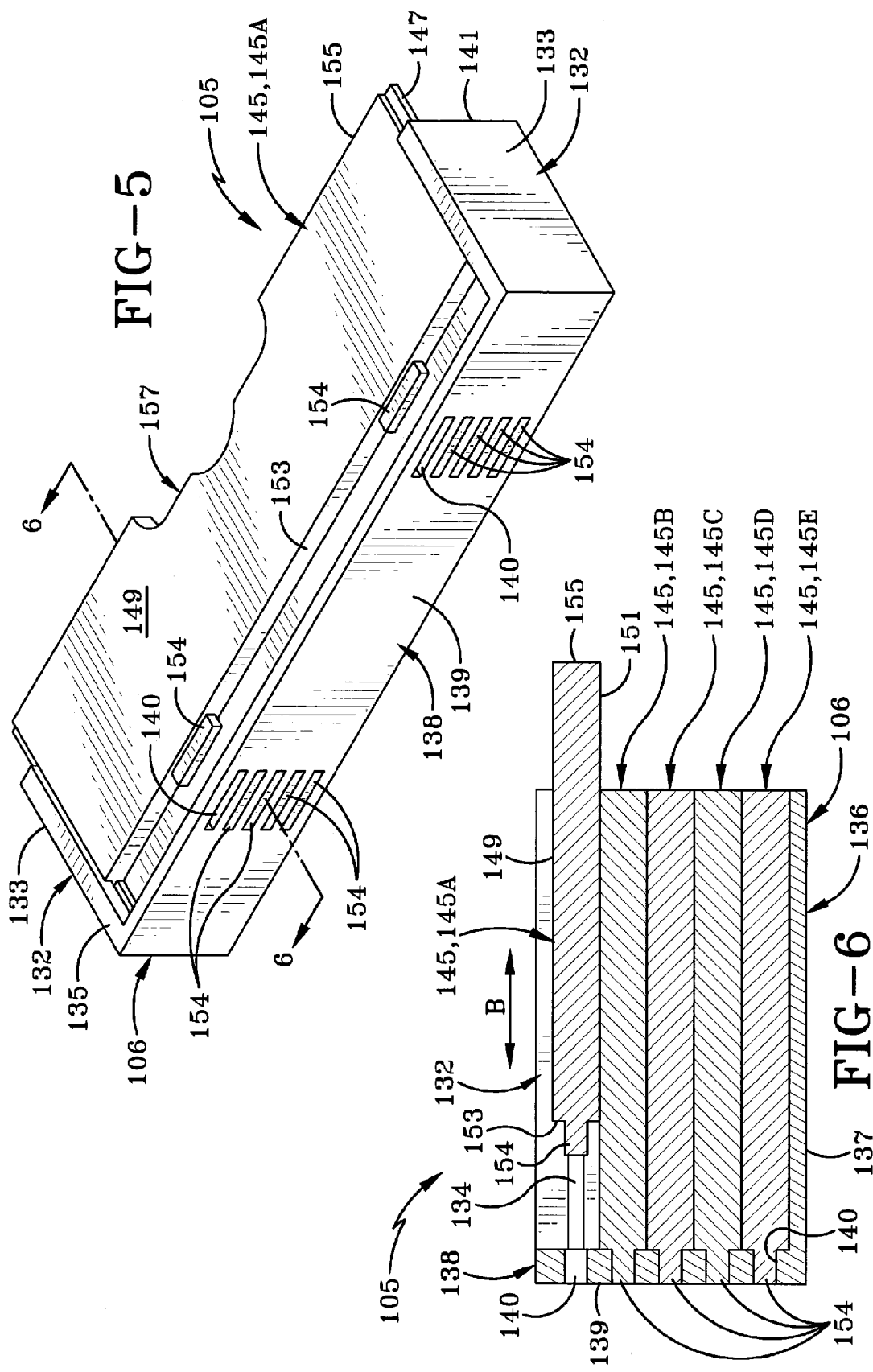

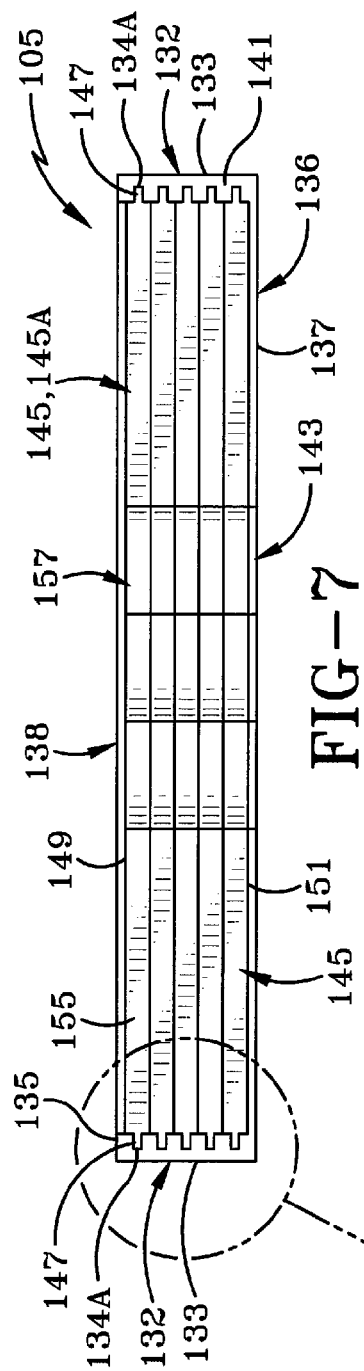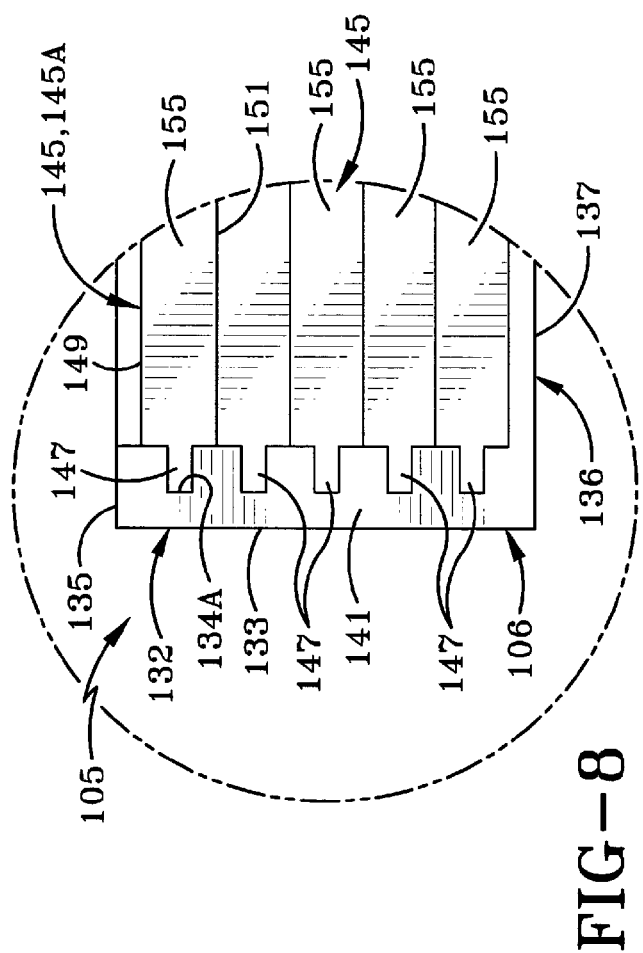
FIG-7
FIG-8

SECURITY CONTAINER WITH REPLACEABLE FACEPLATE

CROSS-REFERENCE TO RELATED APPLICATION

This application claims priority from U.S. Provisional Application Ser. No. 61/391,270, filed Oct. 8, 2010, the disclosure of which is incorporated herein by reference.

BACKGROUND OF THE INVENTION

1. Technical Field

This invention relates to a container for displaying and securing commercial goods. More particularly, this invention relates to selectively configuring the container to provide a visual indication of what type or style of commercial goods is contained therein. Specifically, this invention relates to a color coded cassette insert for a clam-shell security container, which is used to visually indicate compatibility information about the goods contained therein.

2. Background Information

Commercial stores often display goods which are only compatible with one type of an electronic gaming or computer system. For example, a Nintendo® WHO gaming console will only play Wii® games, and likewise for a Microsoft® Xbox® console and games. A Wii® game will not play on an Xbox® console. However, multiple versions of the same goods may be offered. For example, the same game may be offered in the Wii® format as well as the Xbox® format. These games are often sold side-by-side on the store shelf in similar packaging. It is up to the purchaser or store employee to identify whether the particular good is compatible with the particular system. Often the store employee isn't properly trained, or a customer is in a hurry. As such, the store employee or customer may retrieve the wrong item due to ignorance or oversight.

Heretofore, security containers which hold these goods have provided no indication of the style or compatibility of the goods contained therein. These security containers are generally of the "clam-shell" style, which accept and hold the goods between two portions which are locked together. The goods are generally displayed through a transparent portion, and the only indication of the compatibility is on the packaging for the goods. Oftentimes the print is small, or different manufacturers provide the compatibility information in different places on the goods, so the employee is left to search all over the goods, front and back, to determine the compatibility.

Further, during a particularly busy part of the day or during a holiday rush, retailers are typically understaffed or retail associates from other departments are rotated to the busier departments to assist customers. Thus, a retail associate may not be aware of the slight differences in the items, or may not be able to discern these differences quickly. Retail establishments are constantly trying to make shopping more efficient for busy customers, while maintaining a pleasant customer experience. Requiring a customer to wait for the retail associate to study the item, or requiring the customer to return an item to receive the appropriate style is wholly inefficient and typically leads to customer agitation and a poor shopping experience.

Therefore, a need exists in the art to provide a security container which readily visually indicates compatibility information about the goods contained therein to the viewer.

BRIEF SUMMARY OF THE INVENTION

The first embodiment of the present invention relates to a combination of a security container and at least one cassette. The security container includes a top end, a bottom end, a first side, and a second side, wherein the first side and second side are hingedly locked at the bottom end, and releaseably lockable at the top end. The security container further includes a cassette receiving portion defined by the first side and proximate the top end when the first side and second side are locked together. The cassette is sized to be selectively inserted and removed from the cassette receiving portion of the security container. The cassette is generally one solid color, which is outwardly displayed at the top end of the security container when the first and second sides are locked together. The color indicates that the goods contained in that particular security container conform to a particular compatibility with electronic equipment. For example, Nintendo® Wii® games may be indicated by a white cassette, and Microsoft® Xbox® games may be indicated by a black cassette.

The second embodiment of the invention relates to a multi-color cassette for use with the security container described above. The cassette includes a cassette base having a base wall, a pair of sidewalls extending from the base wall, a backwall extending between the pair of sidewalls, an inner surface, and an outer surface. The cassette further includes a plurality of inserts, each insert having a particular color and a protrusion, and a plurality of grooves defined by the inner surface. Each insert is sized to be disposed in the cassette base with the projection of the insert received by one of the plurality of recesses. The cassette base includes an indicator opening or window defined by the base wall and the pair of sidewalls, wherein one of the inserts is visible in the indicator opening when the inserts are disposed in the cassette base. As such, each insert may be moved to the position where the color of the insert is visible through the indicator opening, thereby changing the overall outwardly facing color portrayed by the cassette. The non-visible inserts are disposed in the cassette for future selective use.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 4 is a front side perspective view of the second embodiment of the cassette having a slide removed therefrom;

FIG. 5 is rear side perspective view of the second embodiment of the cassette;

FIG. 6 is a cross-sectional view taken along line 6-6 of FIG. 5;

FIG. 7 is a top plane view of the second embodiment of the cassette; and

FIG. 8 is an enlarged view of a portion of FIG. 7.

Similar numbers refer to similar parts throughout the drawings.

DETAILED DESCRIPTION OF THE INVENTION

Figure 1:
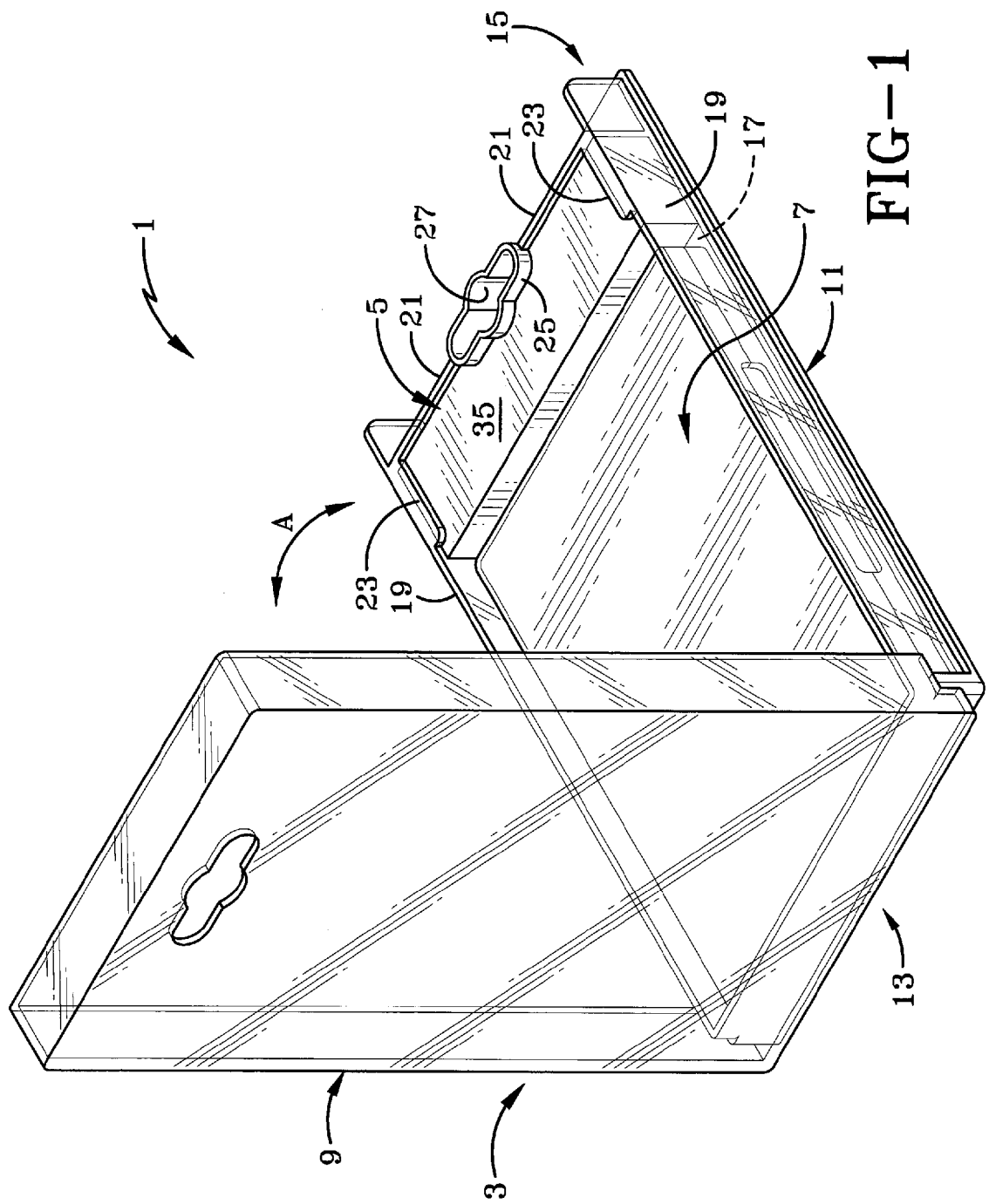
FIG. 1 is a perspective view of a security container having a first embodiment of a cassette of the present invention inserted therein.

The security device of the present invention is shown in FIGS. 1-8 and indicated generally at 1. As shown in FIG. 1, security device 1 includes a security container 3 and a cassette 5 selectively securable thereto. Security container 3 is generally comprised of a first portion 9 and a second portion 11, whereby first portion 9 and second portion 11 are hingedly joined proximate a bottom end 13, and selectively lockable together at a top end 15. First portion 9 and second portion 11 may be rotated with respect to one another in the directions of Arrow A to selectively move security container 3 between an open position (FIG. 1) and a closed position (not shown). First portion 9 is intended to be formed of generally transparent or translucent material to allow a user to see the contents of security container 3 when in the closed position.

Figure 2:
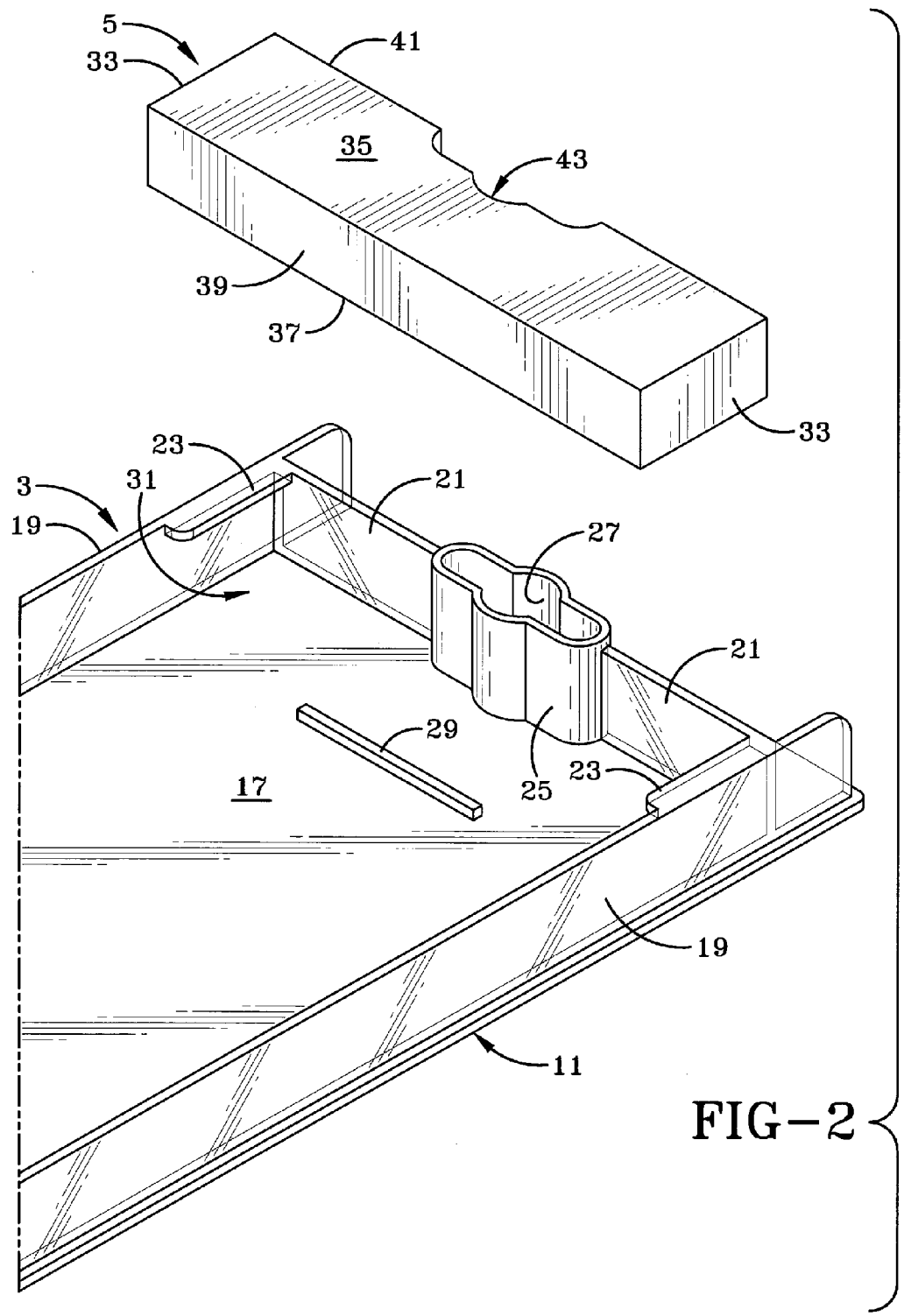
FIG. 2 is an exploded view of the security container and the first embodiment of the cassette.
Figure 3:
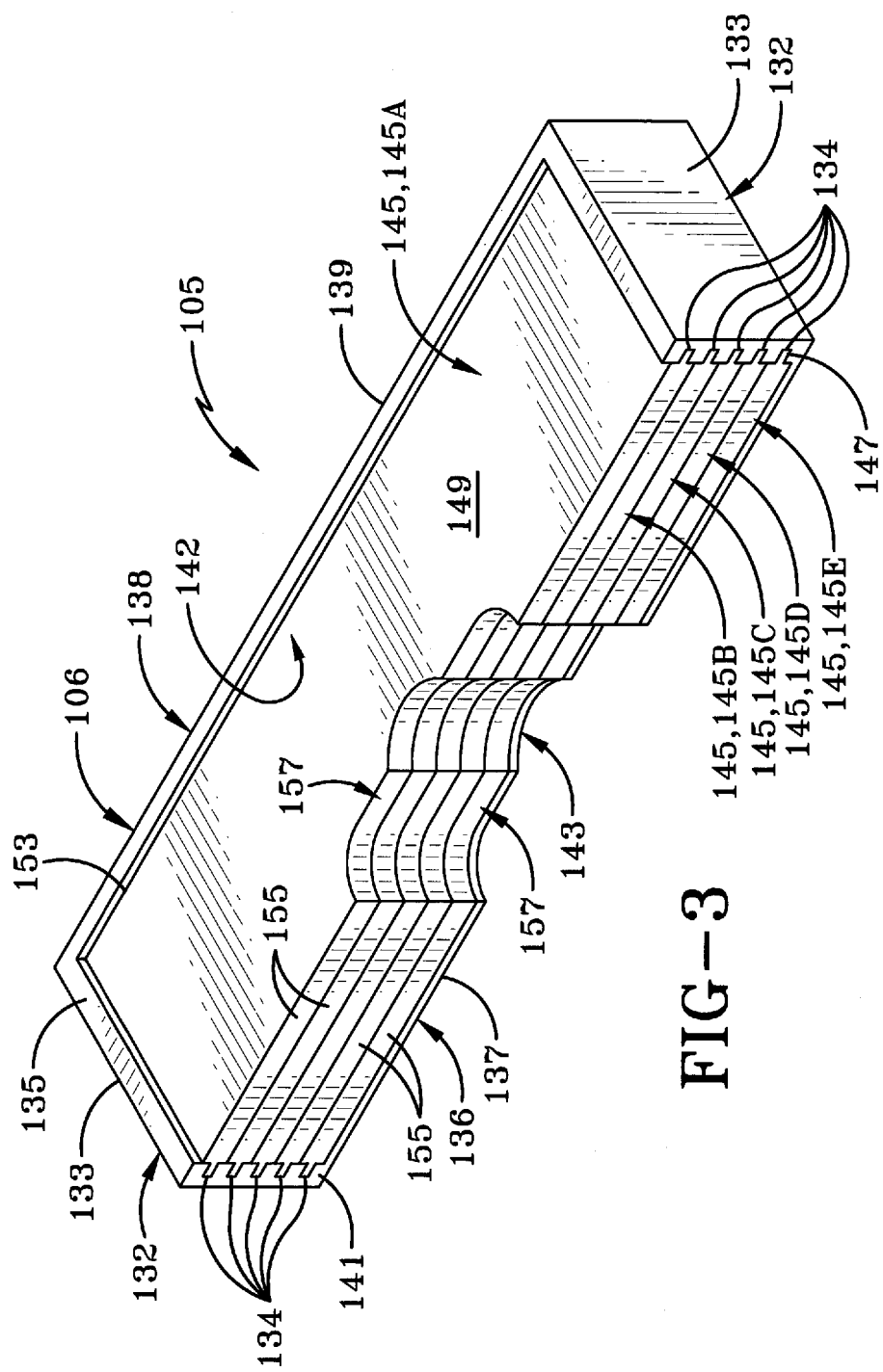
FIG. 3 is a front side perspective view of a second embodiment of the cassette of the present invention.

As shown in FIG. 2, security device 3 further includes a backwall 17, a pair of sidewalls 19, a pair of top walls 21, and a peg receiving wall 25 defining a peg opening 27. Security device 3 further includes a pair of retaining lips 23 extending outwardly away from each sidewall 19 and topwall 21, and a retaining bar 29 extending from backwall 17. Retaining lips 23 and retaining bar 29 cooperate with backwall 17, sidewalls 19, topwalls 21, and peg receiving wall 25 to define a pocket 31, wherein pocket 31 is sized to receive cassette 5 and hold cassette 5 securely therein.

As shown in FIGS. 1 and 2, cassette 5 is generally a rectangular block of plastic material having a pair of side surfaces 33, a front surface 35, a back surface 37, a bottom surface 39, and a top surface 41 having a profiled area 43 and a recess formed therein (not shown) to hold a security tag. When cassette 5 is disposed in pocket 31, top surface 41 abuts topwalls 21, with profiled area 43 sized to complementary abut peg receiving wall 25. Likewise, back surface 37 abuts backwall 17 and side surfaces 33 abut sidewalls 19. As shown in FIG. 1, retaining lips 23 hold cassette 5 in pocket 31 by the abutment formed between retaining lips 23 and front surface 35. Likewise, retaining bar 29 holds cassette 5 in pocket 31 by the abutment formed between retaining bar 29 and bottom surface 39. As such, it will be readily understood that the abutments formed between cassette 5 and security container 3 generally prevent any meaningful movement in all directions when cassette 5 is disposed in pocket 31. As such, cassette 5 is sized and shaped to be selectively disposed in pocket 31 and held therein when security container 3 is in the closed position.

Cassette 5 may be a solid block of material or may include a cavity or opening (not shown) to hold a security tag (not shown) therein. Cassette 5 is intended to have a particular color displayed at least on front surface 35. It is also envisioned that cassette 5 may be formed having this color displayed on all surfaces. As such, multiple cassettes 5 may be included in the present invention and each cassette 5 may be formed having a different color displayed on front surface 35.

In operation, a user opens security container 3 to expose pocket 31 in second portion 11. The user then places cassette 5 inside second portion 11, generally having back surface 37 proximate or abutting second portion 11, side surfaces 33 proximate or abutting sidewalls 19, and top surface 41 proximate and facing top end 15. The user then slides cassette 5 over retaining bar 29 such that retaining bar 29 abuts back surface 37 and retaining lips 23 abut front surface 35. When cassette 5 moves entirely over retaining bar 29, cassette 5 drops into pocket 31 whereby cassette 5 is held securely therein by the various surfaces and retaining elements as discussed above. Cassette 5 is selectively removable from security container 3 by reversing the above steps, and moving back surface 37 over retaining bar 29 to release cassette 5 from pocket 31.

When cassette 5 is securely held in pocket 31 and security container 3 is in the locked position, whatever color is displayed on front surface 35 is outwardly facing in security device 1 through transparent first portion 9, and is readily viewable by a user holding or looking at security device 1. When a user wishes to change the visible color displayed by cassette 5 in security container 3, the user simply removes cassette 5 and replaces it with another cassette 5 having the desired color displayed on front surface 35. As such, the color displayed by security container 1 proximate top end 15 is changeable and customizable by the user simply by changing cassettes 5.

With particular reference to FIGS. 3-8, a second embodiment of the cassette is indicated generally at 105. Cassette 105 is intended to be used with security container 3 in the same general manner as described above with respect to cassette 5, as the overall size and shape of cassette 105 is substantially similar to cassette 5. As such, cassette 105 is inserted and removed from pocket 31 in the manner described above.

Cassette 105 includes a cassette base 106 and a plurality of slides 145. Cassette base 106 includes a pair of sidewalls 132, a backwall 136, and a bottom wall 138 which defines a plurality of tooth slots 140 therein. Sidewalls 132 define a plurality of elongated grooves 134 extending generally from bottom wall 138 along the entire length of sidewalls 132. Sidewalls 132 and bottom wall 138 define a window 142. Cassette base 106 further includes a pair of side surfaces 133, a front surface 135, a back surface 137, a bottom surface 139, and a top surface 141 having a profiled area 143. Sidewalls 132, backwall 136, and bottom wall 138 define an inner cavity 144 (FIG. 6) wherein the plurality of slides 145 may be selectively disposed, shown in FIG. 3 as five slides: 145A, 145B, 145C, 145D, and 145E.

As shown in FIGS. 4-6, each slide 145 is a flat and elongated integral member terminating in a pair of slide projections 147 at each end. Slide 145 includes a front surface 149, a back surface 151 (FIG. 6), a bottom surface 153 (FIG. 5), and a top surface 155 having a profiled area 157. A pair of teeth 154 (FIG. 5) extend outwardly away from bottom surface 153, each of which are complementary shaped to fit into tooth slots 140. Projections 159 include a generally rectangular cross-sectional shape and extend entirely from bottom surface 153 to top surface 155 of slide 145.

As shown in FIGS. 4 and 5, each slide 145 is independently movable within inner cavity 144 along the directions of Arrow B. Elongated grooves 134 are sized to receive projections 147 and guide slide 145 into a stable position within inner cavity 144 of cassette base 106. As shown in FIGS. 5 and 6, tooth slots 140 are aligned to receive teeth 154 extending from bottom surface 153 of slide 145 and properly align and secure slide 145 with bottom wall 138 of cassette base 106. As shown in FIGS. 6 and 7, it is intended that each slide 145 has a corresponding set of elongated grooves 134 in sidewalls 132, and a set of tooth slots 140 in bottom wall 138, such that all slides 145 may be disposed in cassette base 106 at the same time for safekeeping and to provide a "self-contained" multi-colored cassette to the user.

As discussed above, sidewalls 132 and bottom wall 138 form window 142 in cassette base 106. As shown in FIGS. 5-8, window 142 is most proximate a particular elongated groove 134A. When slide 145A is placed in elongated grove 134A slide 145A is outwardly visible through window 142. It is intended that each slide 145 be formed having a particular color. For example, slide 145A is primarily white in color, slide 145B is primarily blue in color, etc. Inasmuch as slides 145 are formed having a particular color, the particular slide 145A which resides in elongated grooves 134A portrays that color outwardly from cassette base 106. When cassette 105 is placed into security container 3, the color of slide 145A disposed in elongated slots 134A is outwardly displayed therefrom. As such, it will be readily understood that a user may select and rearrange the plurality of slides 145 as desired to change the outwardly facing color of cassette 105, thereby changing the overall color displayed proximate top end 15 of security container 3.

It will be readily understood that a security tag (not shown) may be disposed anywhere in or on security device 1, including inside cassette 5 or cassette 105, first portion 9, or second portion 11. Furthermore, it will be readily understood that having described cassette 5 and 105 as portraying a color, any alternative to a solid color is encompassed by the present invention, including wording, indicia, visual characteristics, or multi-colored front surfaces 35 or 135.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A security device comprising:
   a housing movable between an open position and a closed position, the housing configured to receive a product within the housing, wherein the housing comprises a backwall, a pair of sidewalls, and a topwall;
   a lock mechanism for locking the housing in the closed position;
   a pair of retaining lips extending outwardly away from each of the pair of sidewalls and the topwall;
   a retaining bar extending upwardly from the backwall;
   wherein the retaining lips and the retaining bar cooperate with the backwall, the pair of sidewalls, and the top wall, to define a pocket;
   a first cassette removably disposable within the pocket, wherein the topwall, the pair of retaining lips, the retaining bar and the product prevent the first cassette from being removed from the pocket when the product is located within the housing; and
   a first indicia displayed by the first cassette, wherein the first indicia is observable through the housing when the first cassette is disposed in the pocket and indicates that the product conforms to a particular category of products.

2. The security device of claim 1, further comprising:
   a second cassette removably disposable in the pocket;
   a second indicia displayed by the second cassette, wherein the second indicia is observable through the housing when the second cassette is disposed in the pocket.

3. The security device of claim 2, further comprising a first security tag disposed in the first cassette and a second security tag disposed in the second cassette.

4. The security device of claim 1, wherein the first indicia is a color.

5. The security device of claim 2, wherein the housing extends from a top end to a spaced apart bottom end, and wherein the pocket is formed proximate the top end and the lock mechanism is located proximate the top end.

6. The security device of claim 5, wherein the housing includes a first portion and a second portion hingedly connected proximate the bottom end.

7. The security device of claim 1, wherein the first cassette includes a cassette base and a plurality of slides disposable within the cassette base, wherein each of the plurality of slides is configured to display one of the plurality of indicia.

8. The security device of claim 7, further comprising: a window defined by the cassette base; a first slide in the plurality of slides configured to display the first indicia; and wherein the first slide is observable through the window to display the first indicia by the first cassette.

9. The security device of claim 8, further comprising: a second slide in the plurality of slides configured to display a second indicia in the plurality of indicia, wherein the second slide is removably disposable in the cassette base intermediate the first slide and the backwall.

10. The security device of claim 9, further comprising: a bottom wall adjacent the backwall of the cassette base; and the pair of sidewalls adjacent the backwall of the cassette base, wherein the window is at least partially defined by the bottom wall and the pair of sidewalls; and at least one groove defined by one of the sidewalls, wherein the at least one groove is sized to receive a projection extending from the first slide.

11. The security device of claim 10, further comprising at least one tooth slot defined by the bottom wall, wherein the at least one tooth slot is sized to receive a tooth extending from the first slide.

12. The security device of claim 1, wherein the plurality indicia further includes a second indicia, and wherein one of the first indicia and second indicia is selectively displayed by the first cassette.

13. The security device of claim 12, further including a window defined by the cassette, wherein one of the first indicia and second indicia is selectively displayed by the first cassette through the window.

14. The security device of claim 1 wherein the product is for sale and the first cassette is not for sale.

15. The security device of claim 1 further comprising a security tag, the security tag being disposed within the housing such that the security tag is not accessible when the housing is in the closed position and the security tag is not disposed within the cassette.

16. The security device of claim 1 wherein the housing includes a peg opening.

17. The security device of claim 16, wherein the housing includes a first portion and a second portion hingedly connected to the first portion; and wherein the peg opening in the housing passes through the first portion and the second portion.

18. The security device of claim 17 wherein the first cassette includes a profiled area that is contoured to abut a wall of the peg opening.

19. The security device of claim 2, wherein the first indicia is a first color and the second indicia is a second color, and wherein the first color is observably different from the second color.

* * * * *